May 7, 1957  F. R. JOLLEY  2,791,470
PNEUMATIC CONVEYING PLANTS
Filed May 3, 1954  3 Sheets-Sheet 1

Inventor
F. R. Jolley

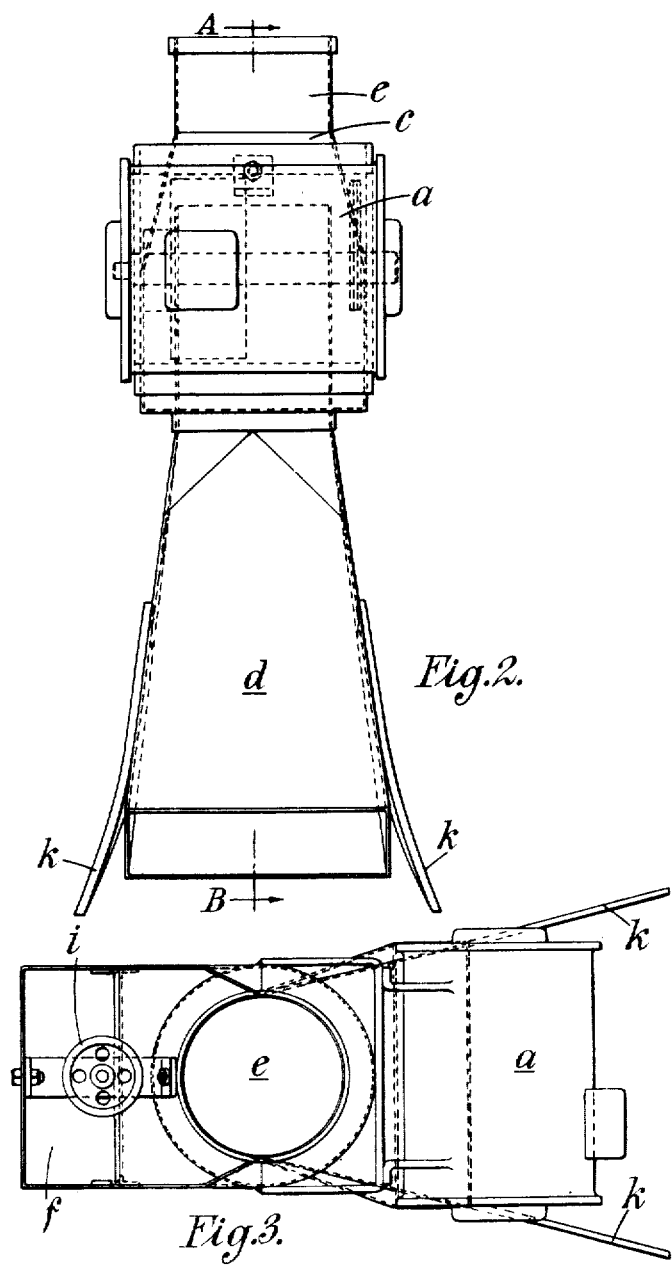

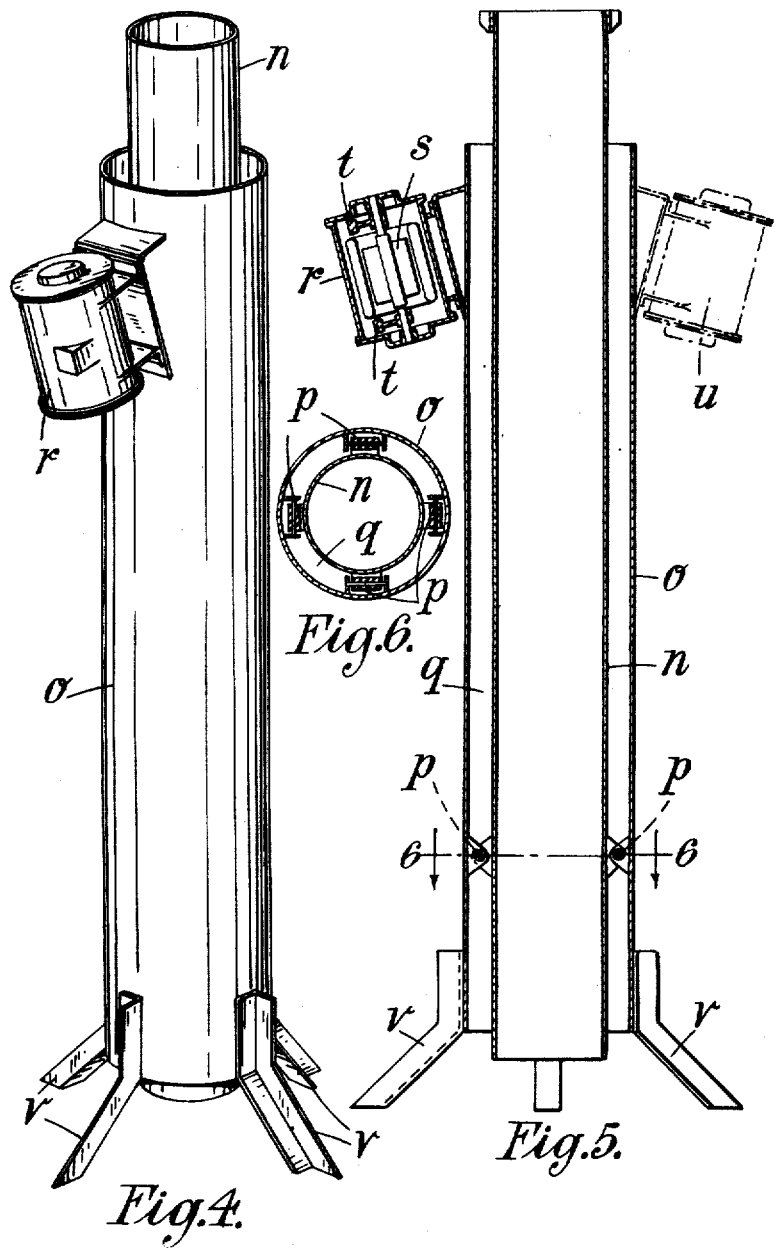

United States Patent Office 2,791,470
Patented May 7, 1957

2,791,470

PNEUMATIC CONVEYING PLANTS

Fred Raby Jolley, Cheadle Heath, Stockport, England, assignor to Simon Handling Engineering Limited, Stockport, England, a British company Application May 3, 1954, Serial No. 427,193

Claims priority, application Great Britain May 13, 1953

3 Claims. (Cl. 302—58)

This invention relates to pneumatic conveying plants and is concerned particularly with the intake nozzles of such plants. When handling sluggish materials which are relatively not free flowing, such as damp coal, gravel, bauxite, phosphate and other chemicals, there is difficulty in ensuring free continuous intake through the nozzle or nozzles into the conveying system and it is the object of the present invention to provide simple and effective means to overcome or obviate the said difficulty.

The invention consists in a pneumatic conveying plant comprising a suction nozzle adapted to be put into the material to be lifted and conveyed, in which a power operated vibrator is operatively associated with the nozzle so that the nozzle vibrates in the material which facilitates the entry of the material into the nozzle.

The invention further comprises a pneumatic conveying plant as aforesaid in which the nozzle at its delivery end is secured in a structure to which an exhaustion branch leading to the conveying system is secured, the power operated vibrator being also secured upon said structure.

The invention further comprises a pneumatic conveying plant as aforesaid in which the structure also incorporates an air box communicating with an annular space between the delivery end of the nozzle and the exhaustion system through a control valve.

The invention further comprises a pneumatic conveying plant as aforesaid in which the lower or receiving end of the nozzle is of rectangular form, tapering to cylindrical form where it is connected to the exhaustion system.

The invention further comprises a pneumatic conveying plant as aforesaid in which one or more prodders project from the nozzle in advance of its open end to facilitate the entry of the nozzle into the material which is being lifted.

Referring to the accompanying explanatory drawings:

Figures 4, 5 and 6 show a modified arrangement of the nozzle of a pneumatic conveying plant. Figure 4 is an elevation, Figure 5 a sectional elevation and Figure 6 a sectional plan view on the line 6—6 of Figure 5.

Figure 1:
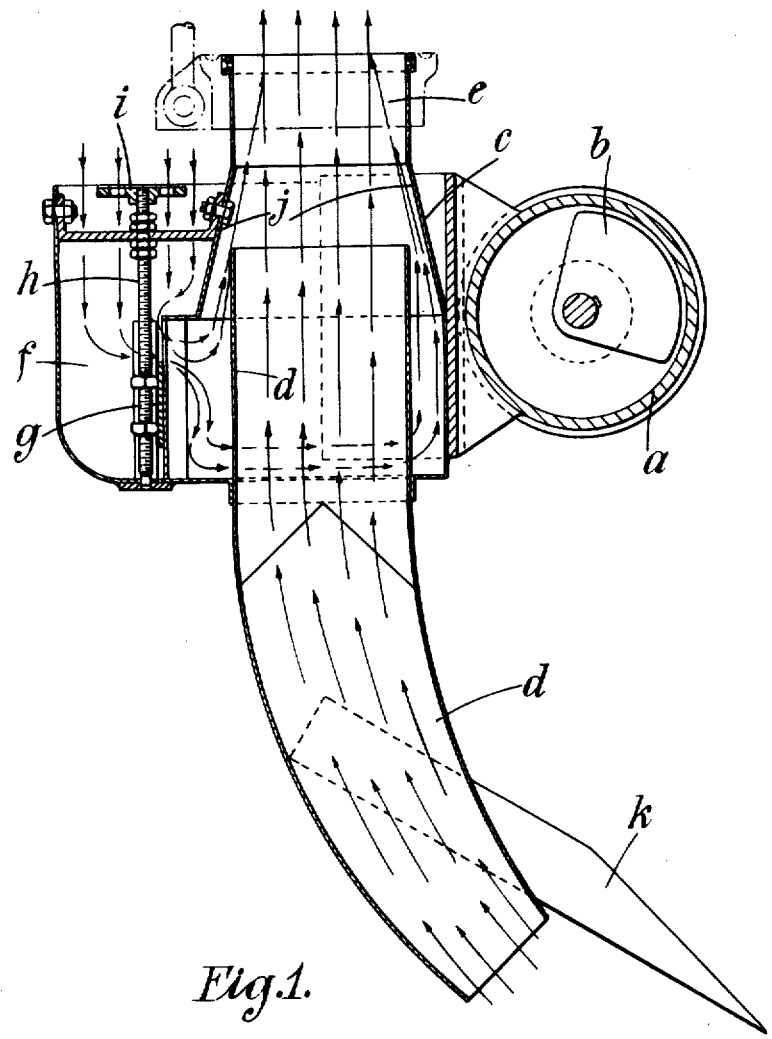
Figure 1 is a sectional elevation on the line A—B, Figure 2 an elevational view and Figure 3 a plan view of the nozzle arrangement of a pneumatic conveying plant constructed in one convenient form in accordance with this invention.

As shown in Figures 1–3, an electrically operated vibrator $a$ comprising revolving out-of-balance weights $b$ is attached to one side of the structure $c$ in which the nozzle $d$ is secured. The vibrator is preferably on the back of the structure away from the operator, where it is most effective in driving the nozzle into the material. The normal exhausting pipe $e$ into which the nozzle $d$ delivers, is secured to the structure $c$ which incorporates the end of the nozzle $d$, the exhausting branch $e$ and an air box $f$. A slide valve $g$ controlled by a screw $h$ and hand wheel $i$ is provided for regulating the rate of admission of air to the annular space between the upper end of the nozzle $d$ and the conical member $j$ leading to the exhaust branch $e$. This supplementary air assists in fluidising the stock being conveyed into the exhaust branch $e$.

The lower portion of the nozzle $d$ is of tapering rectangular form as shown in Figure 2, such form changing to circular immediately before the nozzle enters the structure $c$.

Prodders $k$ are shown projecting in advance of the open end of the nozzle to facilitate the entry of the nozzle into the material which is being lifted.

In some cases the vibrator $a$ may be operated by compressed air or hydraulically. In this case the power unit is mounted on the structure $c$.

In Figures 4, 5 and 6, the suction nozzle $n$ is arranged within a sleeve $o$, to which it is connected preferably adjacent its lower end, by three or more equally spaced flexible bushes $p$, four of which are shown in Figure 6. The annular space $q$ between the nozzle $n$ and the sleeve $o$ forms an air passage through which air travels under the pull of the suction at the open end of the nozzle in order to assist in fluidizing or aerating the stock which is being lifted up the nozzle. A vibrator $r$ (comprising for example an electric motor $s$ driving excentric weights $t$ at the opposite ends of the motor shaft) is attached to the sleeve $o$ to give the desired vibration to the nozzle for the purpose specified. In some cases a single vibrator $r$ may not give the desired vibratory movements in which case I may employ an additional vibrator $u$, shown in dotted lines in Figure 5, at the opposite side of the sleeve $o$ to the vibrator $r$. The two vibrators revolve in synchronism. The flexible bushes $p$ give improved results in modifying the vibratory movements transmitted to the nozzle. $v$ are prodders upon the sleeve $o$ to help the complete unit to penetrate the material which is being lifted.

What I claim is:

1. A pneumatic conveying plant comprising a suction nozzle adapted to be lowered into the material to be lifted and conveyed, prodders projecting in advance of the open end of the nozzle to facilitate its entry into said material, a power operated vibrator operatively connected to said nozzle to cause the prodders to loosen material beneath the nozzle which when conveyed up the nozzle leaves a void into which the nozzle can be lowered, and means admitting supplementary air into the material to assist its conveyance through the nozzle.

2. A pneumatic conveying plant comprising a suction nozzle adapted to be lowered into the material to be lifted and conveyed, said nozzle having a lower receiving end portion of rectangular form tapering into an upper end portion of cylindrical form, prodders connected to said lower end portion and projecting in advance thereof for facilitating entry of said nozzle into said material, a power operated vibrator operatively connected to said nozzle for causing the prodder to loosen material beneath said nozzle, which material when conveyed up by said nozzle leaves a void into which said nozzle can be lowered, and an air box operatively connected to said nozzle upper end portion for admitting supplementary air into the material to assist conveyance thereof up said nozzle.

3. A pneumatic conveying plant comprising a suction nozzle adapted to be lowered into the material to be lifted and conveyed, a sleeve conformingly surrounding said nozzle in spaced relationship thereto thereby forming and air passage for admitting supplementary air into the material to assist conveyance thereof up said nozzle, a plurality of flexible bushes interconnecting said nozzle and said sleeve, prodders secured to said sleeve and projecting in advance thereof for facilitating entry of said sleeve and nozzle into the material, and a power vibrator connected to said sleeve for causing the said prodders to loosen material beneath said nozzle which material when conveyed up by said nozzle leaves a void into which the nozzle can be lowered.

References Cited in the file of this patent

UNITED STATES PATENTS

| | | |
|---|---|---|
| 1,530,654 | Daley | Mar. 24, 1925 |
| 2,719,029 | Steuerman | Sept. 27, 1955 |

FOREIGN PATENTS

| | | |
|---|---|---|
| 166,628 | Great Britain | July 18, 1921 |

UNITED STATES PATENT OFFICE

CERTIFICATE OF CORRECTION

Patent No. 2,791,470                                        May 7, 1957

Fred Raby Jolley

It is hereby certified that error appears in the above numbered patent requiring correction and that the said Letters Patent should read as corrected below.

In the grant, lines 2 and 12, and in the heading to the printed specification, line 4, name of assignee, for "Simon Handling Engineering Limited" read -- Simon Handling Engineers Limited --.

Signed and sealed this 6th day of August 1957.

(SEAL)
Attest:

KARL H. AXLINE

Attesting Officer

ROBERT C. WATSON
Commissioner of Patents